United States Patent
Mohri et al.

(10) Patent No.: US 6,929,829 B2
(45) Date of Patent: Aug. 16, 2005

(54) METHOD AND DEVICE DISCHARGING SURFACE TREATMENT

(75) Inventors: Naotake Mohri, Tokyo (JP); Manabu Yoshida, Tokyo (JP); Akihiro Goto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 119 days.

(21) Appl. No.: 09/872,421

(22) Filed: May 31, 2001

(65) Prior Publication Data

US 2002/0000369 A1 Jan. 3, 2002

Related U.S. Application Data (63) Continuation of application No. PCT/JP99/00822, filed on Feb. 24, 1999, and a continuation of application No. PCT/JP98/05110, filed on Nov. 13, 1998.

(51) Int. Cl.$^7$ ............................. H05H 1/48; H05H 1/52; H01T 1/22; H01T 1/24; H01T 14/00; B23H 1/06
(52) U.S. Cl. .................. 427/540; 427/580; 204/192.38; 204/292.41; 219/69.15; 219/69.17
(58) Field of Search ............................... 427/540, 580; 204/192.38, 292.41; 148/224; 118/723 VE, 723 E; 219/69.15, 69.16, 69.17; 29/825, 868, DIG. 8, DIG. 49

(56) References Cited

U.S. PATENT DOCUMENTS

| | | | |
|---|---|---|---|
| 4,439,660 A | | 3/1984 | Inoue |
| 5,651,901 A | | 7/1997 | Mohri et al. |
| 6,086,684 A | * | 7/2000 | Saito et al. .................. 427/580 |
| 6,437,278 B1 | * | 8/2002 | Inoue et al. .............. 219/69.15 |
| 6,441,333 B1 | * | 8/2002 | Goto et al. .............. 219/69.17 |
| 6,492,611 B2 | * | 12/2002 | Goto et al. .................. 427/580 |
| 6,602,561 B1 | * | 8/2003 | Moro et al. .................. 427/580 |

FOREIGN PATENT DOCUMENTS

| | | |
|---|---|---|
| JP | A 55-42708 | 3/1980 |
| JP | 63-210280 | 8/1988 |
| JP | HEI 5-148615 | 6/1993 |
| JP | A 5-261624 | 10/1993 |
| JP | A 6-246542 | 9/1994 |
| JP | HEI 8-257841 | 10/1996 |
| JP | A 8-300227 | 11/1996 |
| JP | 08-300227 | 11/1996 |
| JP | HEI 9-192937 | 7/1997 |
| JP | A 10-512 | 1/1998 |
| JP | HEI 10-225824 | 8/1998 |
| WO | WO99/58744 | 11/1999 |

OTHER PUBLICATIONS

Translation of Japanese app. No. 8–300227A to Saito et al (PTO version).*

* cited by examiner

*Primary Examiner*—Marianne Padgett
(74) *Attorney, Agent, or Firm*—Sughrue Mion, PLLC (57) ABSTRACT

Powder of a simple substance or a combination of a plurality of carbides of metals belonging to the IVa, Va and Via families in the Periodic Table is mixed with a ferrous-family metal powder or non-ferrous metal powder having the same composition as the treatment target (2) as a simple substance or a combination of a plurality of metals, and this is compressed and molded, and incompletely sintered to form an electrode (12) serving as a discharge processing electrode; and said device is provided with a switching unit which alters electrical conditions at the time when the base member of the treatment target (2) is directly subjected to a discharging surface treatment and the electrical conditions at the time when a coating film (13) that has been formed is subjected to a discharging surface treatment according to the characteristics of the treatment target material. Thus, a discharge is continuously generated between the sintered electrode (12) and the treatment target (2) so that the coating film (13) is continuously allowed to deposit on the surface of the treatment target (2) by the discharging energy to form a thick film.

18 Claims, 7 Drawing Sheets

METHOD AND DEVICE DISCHARGING SURFACE TREATMENT

This application is a continuation of International Application PCT/JP98/05110, filed Nov. 13, 1998, and a continuation of International Application PCT/JP99/00822, filed Feb. 24, 1999.

TECHNICAL FIELD

The present invention in general relates to a discharging surface treatment method by which a discharge is generated between an electrode and a treatment target so that a hard coat film is formed on the surface of the treatment target by the discharging energy. This invention relates to an improvement in the discharging surface treatment method and the device used to realized this method.

BACKGROUND ART

Conventionally, with respect to a technique for coating the surface of a treatment target so as to provide corrosion resistant property and abrasion resistant property, for example, Japanese Patent Application Laid-Open (JP-A) No. 5-148615 has disclosed a discharging surface treatment method. In this technique, a primary treatment (deposition treatment) is carried out by using a green compact electrode made from WC powder and Co powder, etc., and after exchanging this to an electrode that is comparatively less susceptible to electrode consumption, such as a copper electrode, a secondary treatment (re-fusing treatment) is then carried out. Thus, this surface treatment method for a metal material is constituted by the two processes. This conventional technique provides a superior method for forming a hard coat film having a thickness of approximately several tens of $\mu$m on a steel plate. However, a problem with this technique is that it is difficult to form a hard coat film having high adhering strength onto a sintered material such as an ultra-hard alloy.

Figure 7:
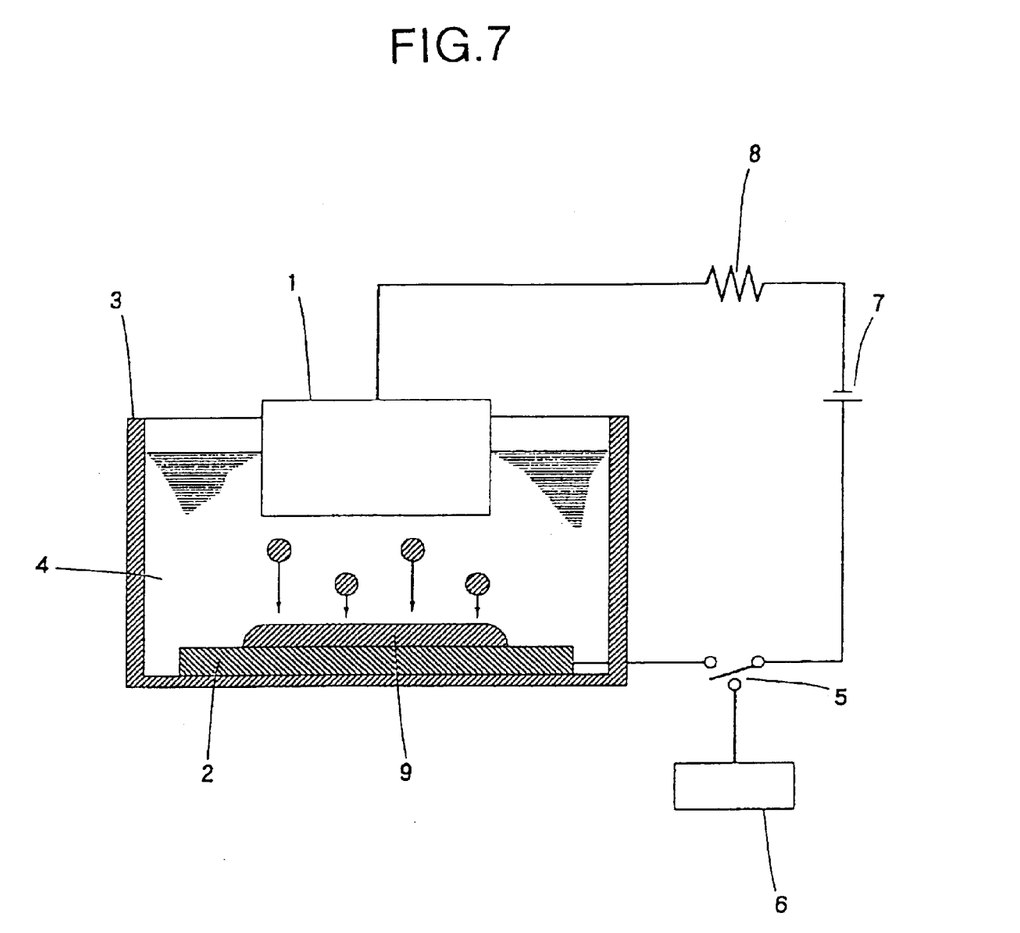
FIG. 7 is a structural drawing that shows a conventional surface treatment method.

Next, referring to FIG. 7, an explanation will be given of a discharging surface treatment method for forming a hard coat film having high adhering strength even to an ultra-hard alloy that is disclosed by Japanese Patent Application Laid-Open (JP-A) No. 9-192937. Reference number 1 represents a green compact electrode formed by compressing and molding TiH$_2$, and reference number 2 represents a treatment target. Reference number 3 represents a treatment vessel, and reference number 4 represents a treatment solution. Reference number 5 represents a switching element for switching voltage and current to be applied to the green compact electrode 1 and the treatment target 2. Reference number 6 represents a control circuit for controlling ON-OFF of the switching element 5, and reference number 7 represents a power supply. Reference number 8 represents a resistor, and reference number 9 represents a hard coat film that has been formed. By using a discharging surface treatment having such an arrangement, it is possible to form a hard coat film having a thickness of approximately several $\mu$m to several tens of $\mu$m on the surface of steel or ultra-hard alloy.

Moreover, Japanese Patent Application Laid-Open (JP-A) No. 10-225824 has disclosed a method in which: a material that generates a highly hard carbide, such as Ti, V, Nb and Ta, is used as an electrode to generate a discharge so that the surface of the treatment target is decarbonated to have a slightly rough surface (pre-treatment), and a discharge is generated by using a TiH$_2$-type green compact electrode so as to carry out a surface treatment (main treatment) on the treatment target. This pre-treatment is carried out so as to provide easy adhesion of the coating material in the main treatment. Moreover, for the same purpose as this, another method has been disclosed in which: a pre-treatment is carried out under a condition where the TiH$_2$-type green compact electrode has a negative polarity with a comparatively small discharging energy, and the same TiH$_2$-type green compact electrode with higher discharging energy is then used so as to carry out the main treatment.

Any of the above-mentioned conventional techniques features that a green compact electrode is used. However, for the following three reasons, it is difficult to put these into practical use.

First, it is difficult to mold an electrode having a size suitable for practical use. In other words, in order to mold the electrode so as to have a size suitable for practical use in the surface treatment for a metal mold, etc., the capability of the pressing device has to be extremely increased, and since upon compressing and molding powder material, a pressure is not uniformly transmitted to the inside of the material to cause unevenness in the density, resulting in defects such as cracks. Moreover, the green compact electrode thus formed is susceptible to collapse in shape, making it difficult to apply this to the secondary treatment, and variations occur in the hard coat film to be formed on the treatment target, resulting in degradation in the quality.

Second, difficulty in dealing with the electrode material. In other words, powder of Ti and TiH$_2$ is susceptible to oxidation, and in particular, TiH$_2$ tends to change with time, that is, to cause hydrolysis even in the air, resulting in difficulty in dealing therewith. Moreover, when put into water, it generates hydrogen gas violently, raising a problem in dealing with waste electrodes.

Third, difficulty in providing a thick film. In other words, the conventional methods are only allowed to form a thickness in the range of several $\mu$m to several tens $\mu$m, and fail to form a hard coat film having a thickness exceeding this thickness that is required from the industrial point of view.

The third reason is explained in more detail below. The formation of a thin-film has been widely carried out by physical vapor deposition and chemical vapor deposition, etc., which are dry processes. However, the formation of a thick-film is hardly carried out by these methods, and at present, it has to be carried out by using a flame coating method, etc. The flame coating method builds up various materials on a treatment target, but the structure is coarse, with the result that it is not suitable for the application such as a coat film on a metal mold that requires precision and durability, and it also has many limitations to materials to be applied.

DISCLOSURE OF THE INVENTION

It is an object of this invention to provide a discharging surface treatment method and a device for such a method, which can effectively form a hard coat film on a treatment target, and easily mold an electrode, as well as forming a thick film of a hard coat film within a desired area range, and which is also suitable for various machine parts such as metal molds, tools and machine essential parts.

In the discharging surface treatment method according to a first aspect of this invention, a powder mixture is formed, comprising as one component: (a) a ferrous-family metal powder or a non-ferrous metal powder, wherein each of the metal powders can be formed of one or plural metals; and, as a second component, (b) one or a plurality of metal carbides, wherein the elemental metal of the carbide or carbides belongs to the IVB, VB or VIB families in the Periodic Table; the non-ferrous metal powder having the same composition as the treatment target; and heating the powder mixture to a temperature at which the component (a) starts to melt to form an electrode serving as a discharge processing electrode, and the electrical conditions at the time when the base member of the treatment target is directly subjected to a discharging surface treatment and the electrical conditions at the time when a hard coat film that has been formed is subjected to a discharging surface treatment are altered according to the characteristics of the treatment target material.

In the discharging surface treatment method according to a second aspect of this invention, a powder mixture is formed, comprising as one component: (a) a ferrous-family metal powder or a non-ferrous metal powder, wherein each of the metal powders can be formed of one or plural metals; and, as a second component, (b) one or a plurality of metal carbides, wherein the elemental metal of the carbide or carbides belongs to the IVB, VB or VIB families in the Periodic Table; the non-ferrous metal powder having the same composition as the treatment target; and heating the powder mixture to a temperature at which the component (a) starts to melt to form an electrode serving as a discharge processing electrode, and the electrical conditions at the time when a hard coat film that has been formed is subjected to a discharging surface treatment are altered at least once according to the characteristics of the treatment target material.

In the discharging surface treatment method according to a third aspect of this invention, a powder mixture is formed, comprising as one component: (a) a ferrous-family metal powder or a non-ferrous metal powder, wherein each of the metal powders can be formed of one or plural metals; and, as a second component, (b) one or a plurality of metal carbides, wherein the elemental metal of the carbide or carbides belongs to the IVB, VB or VIB families in the Periodic Table; the non-ferrous metal powder having the same composition as the treatment target; and heating the powder mixture to a temperature at which the component (a) starts to melt to form an electrode serving as a discharge processing electrode, and the electrical conditions at the time when the base member of the treatment target is directly subjected to a discharging surface treatment and the electrical conditions at the time when a hard coat film that has been formed is subjected to a discharging surface treatment are altered according to the characteristics of the treatment target material, while the electrical conditions at the time when the hard coat film that has been formed is subjected to a discharging surface treatment are altered at least once according to the characteristics of the treatment target material.

In the discharging surface treatment method according to a fourth aspect of this invention, in the configuration according to the first aspect of this invention, it is preferable that an inert gas is interpolated between the discharge processing electrode and the treatment target.

In the discharging surface treatment method according to a fifth aspect of this invention, in the configuration according to the second aspect of this invention, it is preferable that an inert gas is interpolated between the discharge processing electrode and the treatment target.

In the discharging surface treatment method according to a sixth aspect of this invention, in the configuration according to the third aspect of this invention, it is preferable that an inert gas is interpolated between the discharge processing electrode and the treatment target.

In the discharging surface treatment method according to a seventh aspect of this invention, in the configuration according to the first aspect of this invention, it is preferable that the discharge processing electrode is allowed to scan the treatment target so that the hard coat film is formed on the surface of the treatment target.

In the discharging surface treatment method according to a eighth aspect of this invention, in the configuration according to the second aspect of this invention, it is preferable that the discharge processing electrode is allowed to scan the treatment target so that the hard coat film is formed on the surface of the treatment target.

In the discharging surface treatment method according to a ninth aspect of this invention, in the configuration according to the third aspect of this invention, it is preferable that the discharge processing electrode is allowed to scan the treatment target so that the hard coat film is formed on the surface of the treatment target.

In the discharging surface treatment device according to a tenth aspect of this invention, a powder mixture is formed, comprising as one component: (a) a ferrous-family metal powder or a non-ferrous metal powder, wherein each of the metal powders can be formed of one or plural metals; and, as a second component, (b) one or a plurality of metal carbides, wherein the elemental metal of the carbide or carbides belongs to the IVB, VB or VIB families in the Periodic Table; the non-ferrous metal powder having the same composition as the treatment target; and heating the powder mixture to a temperature at which the component (a) starts to melt to form an electrode serving as a discharge processing electrode. Moreover, the above-mentioned device is provided with a switching unit which alters the electrical conditions at the time when the base member of the treatment target is directly subjected to a discharging surface treatment and the electrical conditions at the time when a hard coat film that has been formed is subjected to a discharging surface treatment according to the characteristics of the treatment target material.

In the discharging surface treatment device according to a eleventh aspect of this invention, a powder mixture is formed, comprising as one component: (a) a ferrous-family metal powder or a non-ferrous metal powder, wherein each of the metal powders can be formed of one or plural metals; and, as a second component, (b) one or a plurality of metal carbides, wherein the elemental metal of the carbide or carbides belongs to the IVB, VB or VIB families in the Periodic Table; the non-ferrous metal powder having the same composition as the treatment target; and heating the powder mixture to a temperature at which the component (a) starts to melt to form an electrode serving as a discharge processing electrode. Moreover, the device is provided with a switching unit which alters the electrical conditions at the time when a hard coat film that has been formed is subjected to a discharging surface treatment at least once according to the characteristics of the treatment target material.

In the discharging surface treatment device according to a twelfth aspect of this invention, a powder mixture is formed, comprising as one component: (a) a ferrous-family metal powder or a non-ferrous metal powder, wherein each of the metal powders can be formed of one or plural metals; and, as a second component, (b) one or a plurality of metal carbides, wherein the elemental metal of the carbide or carbides belongs to the IVB, VB or VIB families in the Periodic Table; the non-ferrous metal powder having the same composition as the treatment target; and heating the powder mixture to a temperature at which the component (a)

starts to melt to form an electrode serving as a discharge processing electrode. Moreover, the above-mentioned device is provided with a first switching unit which alters the electrical conditions at the time when the base member of the treatment target is directly subjected to a discharging surface treatment and the electrical conditions at the time when a hard coat film that has been formed is subjected to a discharging surface treatment according to the characteristics of the treatment target material, and a second switching unit which alters the electrical conditions at the time when the hard coat film that has been formed is subjected to a discharging surface treatment at least once according to the characteristics of the treatment target material.

In the discharging surface treatment device according to a thirteenth aspect of this invention, in the configuration according to the tenth aspect of this invention, it is preferable that an inert-gas supplying unit is installed so as to interpolate an inert gas between the discharge processing electrode and the treatment target.

In the discharging surface treatment device according to a fourteenth aspect of this invention, in the configuration according to the eleventh aspect of this invention, it is preferable that an inert-gas supplying unit is installed so as to interpolate an inert gas between the discharge processing electrode and the treatment target.

In the discharging surface treatment device according to a fifteenth aspect of this invention, in the configuration according to the twelfth aspect of this invention, it is preferable that an inert-gas supplying unit is installed so as to interpolate an inert gas between the discharge processing electrode and the treatment target.

In the discharging surface treatment device according to a sixteenth aspect of this invention, in the configuration according to the tenth aspect of this invention, it is preferable that an X-axis driving device, a Y-axis driving device and a Z-axis driving device, which relatively shift the sintered electrode and the treatment target in the X-direction, Y-direction and Z-direction, are installed so that the X-axis driving device, the Y-axis driving device and the Z-axis driving device allow the discharge processing electrode to scan the treatment target to form the hard coat film on the surface of the treatment target.

In the discharging surface treatment device according to a seventeenth aspect of this invention, in the configuration according to the eleventh aspect of this invention, it is preferable that an X-axis driving device, a Y-axis driving device and a Z-axis driving device, which relatively shift the discharge processing electrode and the treatment target in the X-direction, Y-direction and Z-direction, are installed so that the X-axis driving device, the Y-axis driving device and the Z-axis driving device allow the sintered electrode to scan the treatment target to form the hard coat film on the surface of the treatment target.

In the discharging surface treatment device according to a eighteenth aspect of this invention, in the configuration according to the twelfth aspect of this invention, it is preferable that an X-axis driving device, a Y-axis driving device and a Z-axis driving device, which relatively shift the discharge processing electrode and the treatment target in the X-direction, Y-direction and Z-direction, are installed so that the X-axis driving device, the Y-axis driving device and the Z-axis driving device allow the sintered electrode to scan the treatment target to form the hard coat film on the surface of the treatment target.

Since the present invention has the above-mentioned arrangement, the following effects are obtained.

The discharging surface treatment method according to any one of the first to third aspects makes it possible to easily form an electrode and also to form a hard coat film having high adhesion to the treatment target efficiently. Therefore, the discharging surface treatment method is applicable to various machine parts such as molds, tools and machine constituent parts. Moreover, the hard coat film is allowed to deposit on the treatment target with an area virtually equal to the area of the electrode, thereby making it possible to eliminate the need of a masking treatment.

The discharging surface treatment method according to the fourth aspect has such an effect in addition to the effects of the first aspect that the structure is simplified.

The discharging surface treatment method according to the fifth aspect has such an effect in addition to the effects of the second aspect that the structure is simplified.

The discharging surface treatment method according to the sixth aspect has such an effect in addition to the effects of the third aspect that the structure is simplified.

In addition to the effects of the first aspect, the discharging surface treatment method according to the seventh aspect makes it possible to use a small-size discharge processing electrode, and the process is carried out with this electrode being allowed to scan. Therefore, it is not necessary to use a large-size sintered electrode having a specific shape, and it is possible to form a hard coat film with the small-size discharge processing electrode being allowed to scan on the entire curved face of the treatment target, such as a mold, having a three-dimensional free curved face, so as to have a uniform thickness over the entire area or a varied film thickness, if necessary.

In addition to the effects of the second aspect, the discharging surface treatment method according to the eighth aspect makes it possible to use a small-size discharge processing electrode, and the process is carried out with this electrode being allowed to scan. Therefore, it is not necessary to use a large-size discharge processing electrode having a specific shape, and it is possible to form a hard coat film with the small-size discharge processing electrode being allowed to scan on the entire curved face of the treatment target, such as a mold, having a three-dimensional free curved face, so as to have a uniform thickness over the entire area or a varied film thickness, if necessary.

In addition to the effects of the third aspect, the discharging surface treatment method according to the ninth aspect makes it possible to use a small-size discharge processing electrode, and the process is carried out with this electrode being allowed to scan. Therefore, it is not necessary to use a large-size discharge processing electrode having a specific shape, and it is possible to form a hard coat film with the small-size discharge processing electrode being allowed to scan on the entire curved face of the treatment target, such as a mold, having a three-dimensional free curved face, so as to have a uniform thickness over the entire area or a varied film thickness, if necessary.

The discharging surface treatment device according to any one of the tenth to twelfth aspects makes it possible to easily form an electrode and also to form a hard coat film having high adhesion to the treatment target efficiently. Therefore, the discharging surface treatment method is applicable to various machine parts such as molds, tools and machine constituent parts. Moreover, the hard coat film is allowed to deposit on the treatment target with an area virtually equal to the area of the electrode, thereby making it possible to eliminate the need of a masking treatment.

The discharging surface treatment device according to the thirteenth aspect has such an effect in addition to the effects of the tenth aspect that the structure is simplified.

The discharging surface treatment device according to the fourteenth aspect has such an effect in addition to the effects of the eleventh aspect that the structure is simplified.

The discharging surface treatment device according to the fifteenth aspect has such an effect in addition to the effects of the twelfth aspect that the structure is simplified.

In addition to the effects of the tenth aspect, the discharging surface treatment device according to the sixteenth aspect makes it possible to use a small-size discharge processing electrode, and the process is carried out with this electrode being allowed to scan. Therefore, it is not necessary to use a large-size discharge processing electrode having a specific shape, and it is possible to form a hard coat film with the small-size discharge processing electrode being allowed to scan on the entire curved face of the treatment target, such as a mold, having a three-dimensional free curved face, so as to have a uniform thickness over the entire area or a varied film thickness, if necessary.

In addition to the effects of the eleventh aspect, the discharging surface treatment method according to the seventeenth aspect makes it possible to use a small-size discharge processing electrode, and the process is carried out with this electrode being allowed to scan. Therefore, it is not necessary to use a large-size discharge processing electrode having a specific shape, and it is possible to form a hard coat film with the small-size discharge processing electrode being allowed to scan on the entire curved face of the treatment target, such as a mold, having a three-dimensional free curved face, so as to have a uniform thickness over the entire area or a varied film thickness, if necessary.

In addition to the effects of the twelfth aspect, the discharging surface treatment method according to the eighteenth aspect makes it possible to use a small-size discharge processing electrode, and the process is carried out with this electrode being allowed to scan. Therefore, it is not necessary to use a large-size discharge processing electrode having a specific shape, and it is possible to form a hard coat film with the small-size discharge processing electrode being allowed to scan on the entire curved face of the treatment target, such as a mold, having a three-dimensional free curved face, so as to have a uniform thickness over the entire area or a varied film thickness, if necessary.

BEST MODE FOR CARRYING OUT THE INVENTION

First Embodiment

Figure 1:
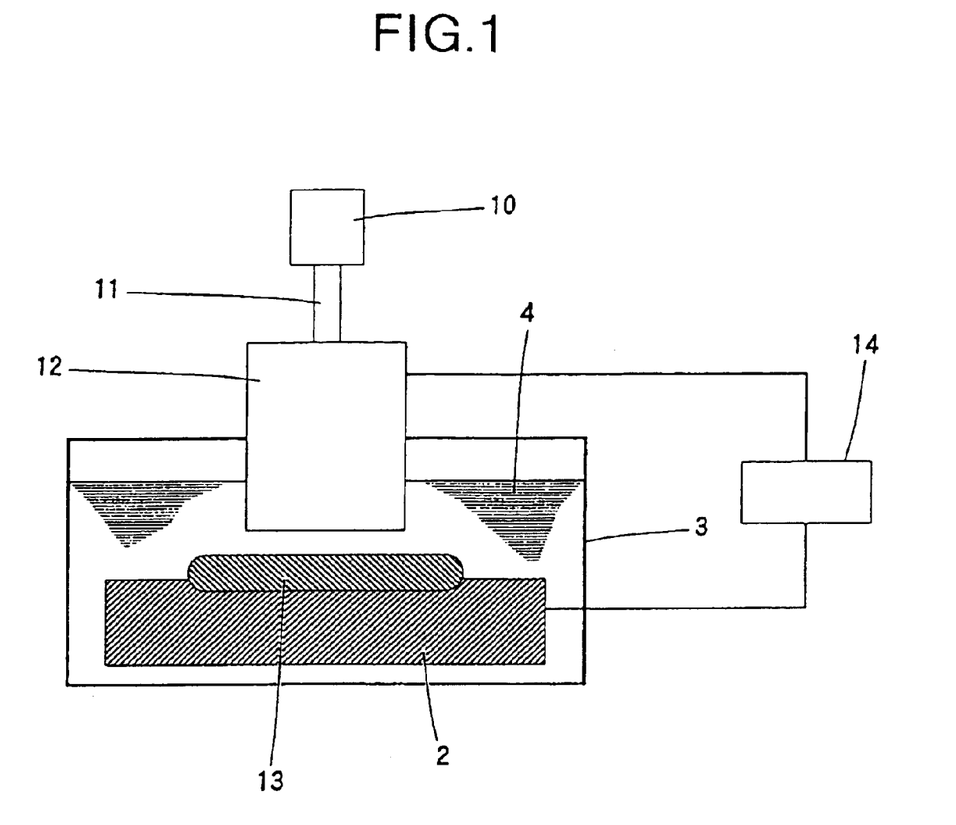
FIG. 1 is a structural drawing that shows a discharging surface treatment method and a device for such a method according to a first embodiment of the present invention.

FIG. 1 is a structural drawing that shows a discharging surface treatment method and a device for such a method according to a first embodiment of the present invention. Reference number 2 represents a treatment target, and reference number 3 represents a processing vessel. Reference number 4 represents a processing fluid, such as insulating oil or water. Reference number 10 represents a shifting motor, and reference number 11 represents a shifting thread. Reference number 12 represents a discharge processing electrode, and reference number 13 represents a hard coat film formed on the treatment target 2. Reference number 14 represents a control device, provided with a power supply, for controlling a current and a voltage. The shifting motor 10, controlled by a controlling system not shown, is designed so that the discharge processing electrode 12 is shifted toward the treatment target 2 in a desired control mode, such as a servo-shifting mode and a constant-shifting mode, through the shifting thread 11.

As mentioned-above, the processing fluid 4 is insulating oil or water. Following advantages are obtained when the insulating oil is used. That is, conventional techniques of discharge processing devices that have been widely used are applicable, as they are, and a comparatively simple structure is available. On the other hand, if water is used, in some cases, hydroxides may be generated simultaneously as the reaction takes place, resulting in a problem when a high-quality coat film is required. However, in the case of the application of a non-electrolytic power supply in a wire discharge processing device that has been widely used at present, the above-mentioned disadvantage is reduced to a minimum so that even water is used as the processing fluid, it becomes possible to form a hard coat film having virtually the same characteristics as that produced by using an insulating oil as the processing fluid from the viewpoint of practical use.

A method of manufacturing the discharge processing electrode 12 will now be explained. A powder is mixed with a ferrous-family metal powder, or non-ferrous metal powder, as a simple substance or a combination of a plurality of metals, wherein the powder is formed by a simple substance or a combination of a plurality of carbides of metals belonging to the IVB, VB, and VIB families in the Periodic Table (for example, WC, TiC, TaC, etc.), and wherein the ferrous-family metal powder such as Fe, Co and Ni, or non-ferrous metal powder having the same composition as the treatment target (for example, Al alloy powder, etc.), further wherein the powder mix is compressed and molded into a predetermined shape, thereby manufacturing a green compact electrode. Then, this is put into a vacuum furnace, etc., and the temperature inside the furnace is gradually increased so as to harden the green compact electrode to a degree, for example, approximately as hard as chalk so that it has sufficient strength to withstand a mechanical machining process and also is not hardened too much (this process is referred to as "incomplete sintering process"). In this state, the ferrous-family metal such as Co starts to melt and seep into gaps between carbides, thereby forming a so-called solid solution. In contrast, at contact portions between the carbides, although mutual bonding progresses, the bonding is weak because the temperature is comparatively low with the result that a main sintering process is not attained. The discharge processing electrode in this state, which has been subjected to the incomplete sintering process, is taken out, and machined and sized to a predetermined shape. Thus, this is used as the discharge processing electrode 12.

The conditions of the above-mentioned incomplete sintering process are different depending on electrode materials. However, this is determined preliminarily through experiments. For example, the sintering temperature is set approximately in the range of 400 to 1100 degree centigrade.

In this case, it is essential not to raise the temperature in an incomplete sintering process to approximately not less than 1100 centigrade. The temperatures exceeding this temperature make the electrode too hard, resulting in a problem in which in the next discharging process, the electrode material comes off irregularly due to a thermal impact caused by arc discharging, failing to properly supply discharging between the electrodes, resulting in serious adverse effects to the quality of the coat film formed on the treatment target.

Next, an explanation will be given of a formation method of the hard coat film 13. When an arc discharge is generated intermittently or continuously between the discharge processing electrode 12 and the treatment target 2, the pole-to-pole gap has a high temperature locally due to arc heat. First, when an arc discharge is generated once, one portion of the electrode material comes off between the poles, and is simultaneously discharged in a powdered state by the thermal impact energy at portions of the discharge processing electrode 12 incompletely sintered facing the treatment target 2. Since the pole-to-pole gap enters a high-temperature plasma state of not less than several thousands of degree centigrade momentarily, most portions of the electrode material are completely fused. The surface of the treatment target facing the electrode is also heated instantaneously at the generation position of the arc discharge, and fused in the same manner as the electrode material. At this high-temperature state, the fused electrode material and the treatment target are mutually mixed with each other to form an alloy phase between the electrode material and the treatment target on the treatment target. Next, since the processing fluid is located in the pole-to-pole gap and in the vicinity thereof, this is abruptly cooled off, and during a cooling phase from the high-temperature state, an interface reaction between the liquid phase of the ferrous-family metal and the solid phase of the carbides or a solid-solution forming reaction between the solid phases of the carbides instantaneously occurs, thereby executing a main sintering process in an extremely short time. In this manner, a hard coat film 13 is formed on the treatment target 2. When this process is repeated, the deposition of the coat film progresses as the time elapses, thereby making it possible to form a thick film.

Figure 2:
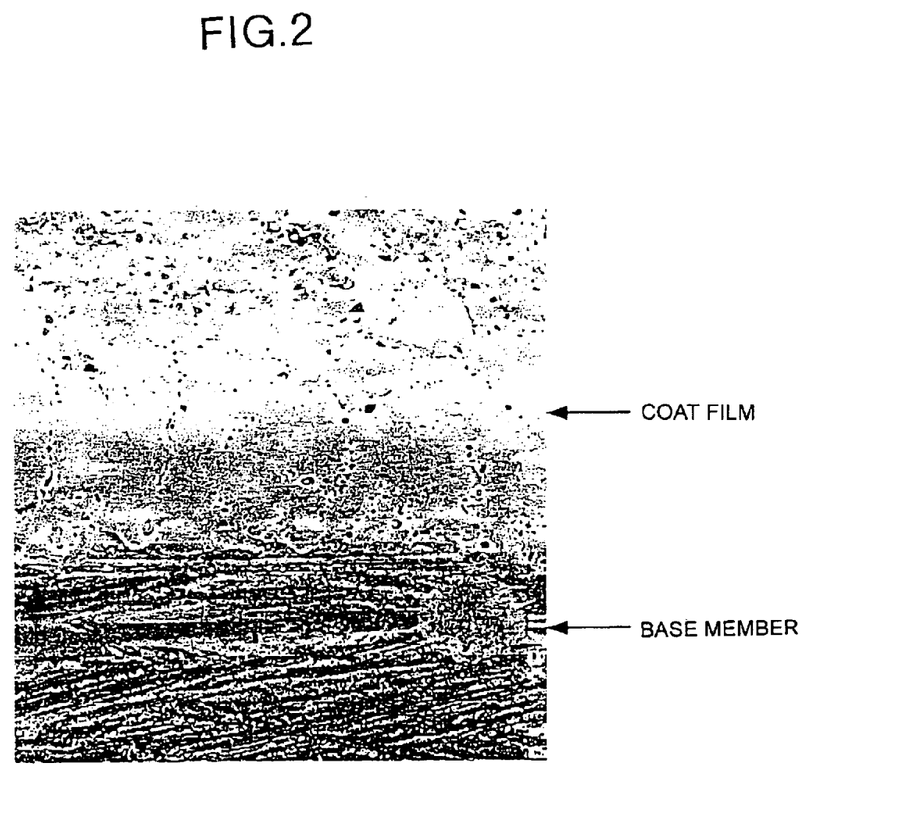
FIG. 2 is a drawing that shows a state in which a hard coat film is deposited by continuous discharging in the discharging surface treatment method and the device thereof according to the first embodiment the present invention.

FIG. 2 shows a state in which the hard coat film is depositing due to continuous discharges. It can be clearly seen that the hard coat films, each formed by a single discharge, are allowed to deposit in a folded manner.

Figure 3:
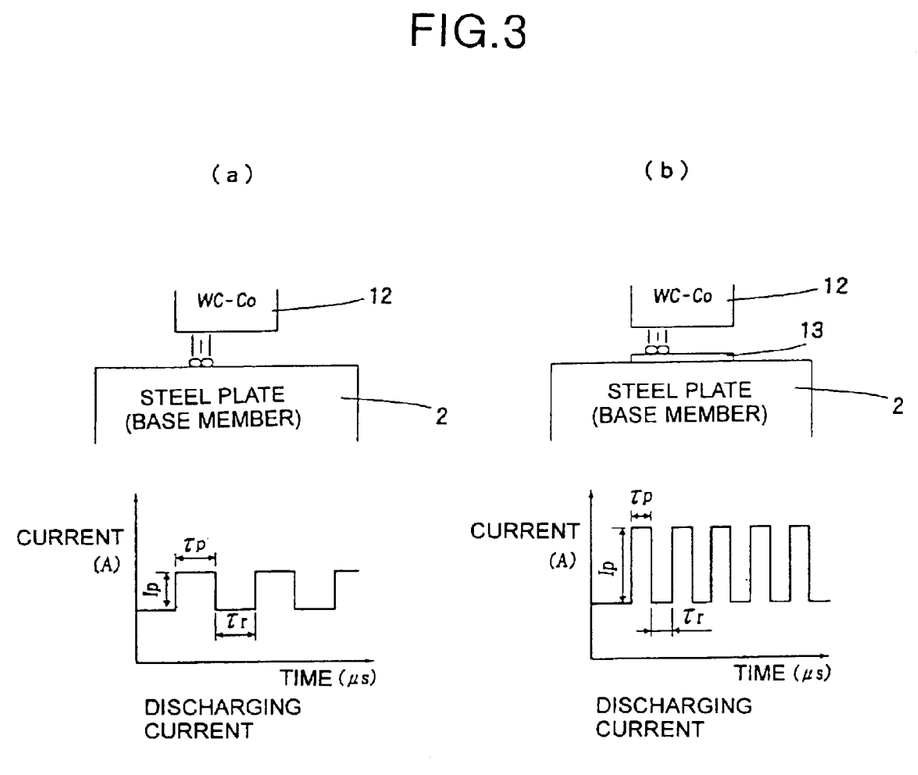
FIG. 3 is a drawing that shows a state in which a thick film is formed in the discharging surface treatment method and the device thereof according to the first embodiment of the present invention.

FIG. 3 shows a state in which a thick film is formed and a discharge current at this time. WC-Co is used as the discharge processing electrode 12 and a steel plate is used as the treatment target 2. Moreover, FIG. 3(*a*) shows a case in which a discharge is directly applied to the base member of the treatment target 2, and FIG. 3(*b*) shows a case in which, after a hard coat film 13 has been formed, a discharge is further applied thereto. Depending on the cases in which a discharge is directly applied to the base member of the treatment target 2 and in which a discharge is applied after the hard coat film 13 has been formed, electrical conditions including the discharge current value Ip, the discharge current pulse width τp and the pause time τr are properly altered so as to fit to the characteristics of the subject material. Moreover, depending on cases, the poles of the electrode are also changed. This is because the base member and the hard coat film formed later are respectively different in material characteristics and hardness. Therefore, the electrical conditions are altered so as to fit to the characteristics of the subject material depending on the cases in which a discharge is directly applied to the base member and in which a discharge is further applied after the hard coat film has been formed so as to fit to the characteristics of the subject material; consequently, the electrical conditions suitable for the corresponding subject material are adopted so that it becomes possible to carry out the process in a shorter time, and also to form a hard coat film with high adhesion. Such electrical conditions suitable for the respective characteristics of the subject materials are preliminarily determined through experiments, etc., and the control device 14 alters these according to the characteristics of the subject material. For example, the alteration of each of the discharging current value Ip, the discharging current pulse width τp and the pause time τr is carried out by switching operations of switches 15 and 16 and the controlling operations of the switching in the control circuit shown in FIG. 4.

Moreover, the above description has shown a case in which the electrical conditions are altered depending on the cases in which a discharge is directly applied to the base member and in which a discharge is further applied after the hard coat film has been formed. However, even in the course of formation of a thick, hard coat film, the electrical conditions may be altered according to the characteristics of the subject material.

Figure 4:
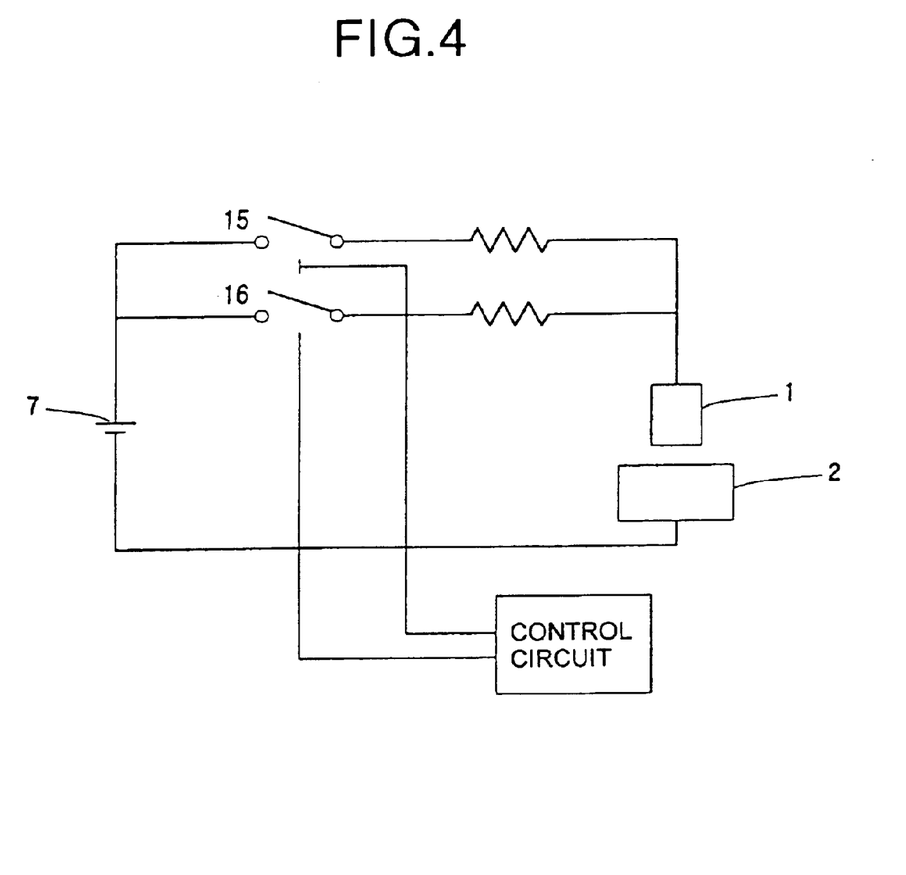
FIG. 4 is a drawing that shows a switching unit for altering electrical conditions in the discharging surface treatment method and the device thereof according to the first embodiment the present invention.

Moreover, in FIG. 4, two switches are used for the switching operations. However, three or more switches may be used. Moreover, any means that can alter the current, such as a variable resistor for changing a current, may be used.

Moreover, FIG. 3 has exemplified a case in which a steel plate is used as the base member of the treatment target. However, when the base member is made of a cemented carbide, Ti-based materials may be used as the electrode. The current waveform is altered in response to various combinations between such treatment target materials and the electrodes.

Second Embodiment

Figure 5:
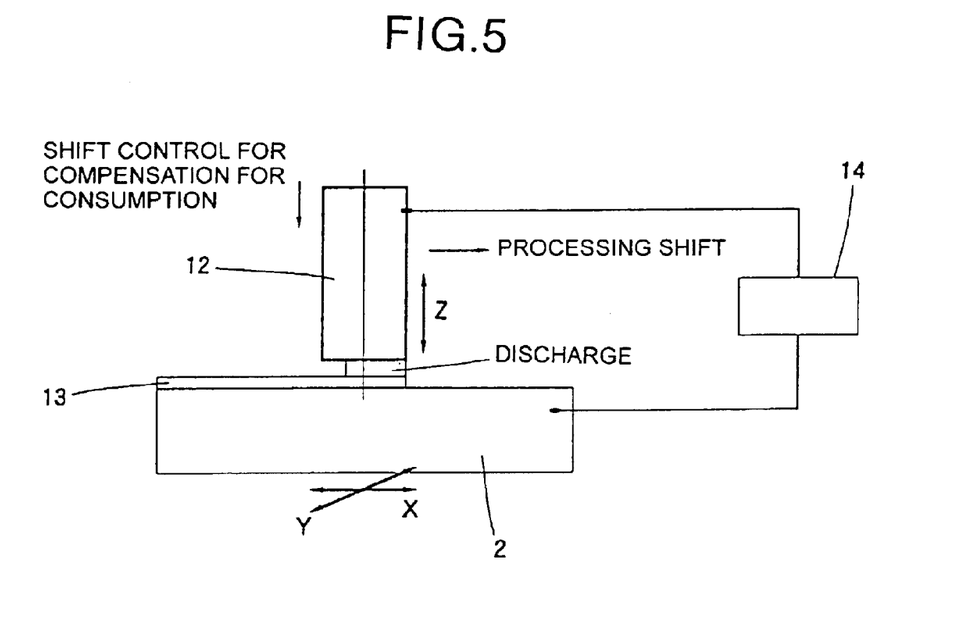
FIG. 5 is a structural drawing that shows a discharging surface treatment method and a device for such a method according to a second embodiment of the present invention.

FIG. 5 is a structural drawing that shows a discharging surface treatment method and a device for such a method according to a second embodiment of the present invention. Reference number 2 represents a treatment target, and reference number 12 represents a discharge processing electrode. Reference number 13 represents a hard coat film formed on the treatment target 2. Reference number 14 represents a control device, provided with a power supply, for controlling a current and a voltage. The hard coat film 13 is formed on the surface of the treatment target 2 while the discharge processing electrode 12 and the treatment target 2 are relatively shifted in the X-direction, Y-direction and Z-direction by using an X-axis driving device, a Y-axis driving device and a Z-axis driving device, not shown. For example, when the treatment target 2 is a mold, its surface is not a plane face, and has a three-dimensional shape with complex free curved faces. However, the X-axis driving device, the Y-axis driving device and the Z-axis driving device allow the discharge processing electrode 12 to scan along the free curved face of the mold with the gap being maintained constant or the servo-voltage being maintained constant. In this case, since the electrode is consumed very quickly, a compensating shifting operation is required for compensating for the electrode consumption. Therefore, the movement control of the main axis for supporting the electrode in the Z-axis direction needs to be carried out accurately and quickly. The above-mentioned operations are repeated so that the electrode is allowed to scan all over the curved faces constituting the mold. Thus, it becomes possible to deposit the hard coat film over the entire area uniformly, or with a varied film thickness, if necessary.

Moreover, when a discharge is directly applied to the base member of the treatment target and when a discharge is further applied after the hard coat film has been formed, or in the course of formation of the thick, hard coat film, the electric conditions are altered so as to fit to the characteristics of the subject treatment material, that is, the electric conditions suitable for the subject treatment material are adopted. Thus, it becomes possible to carry out the process in a shorter time, and also to form a hard coat film with high adhesion.

Third Embodiment

Figure 6:
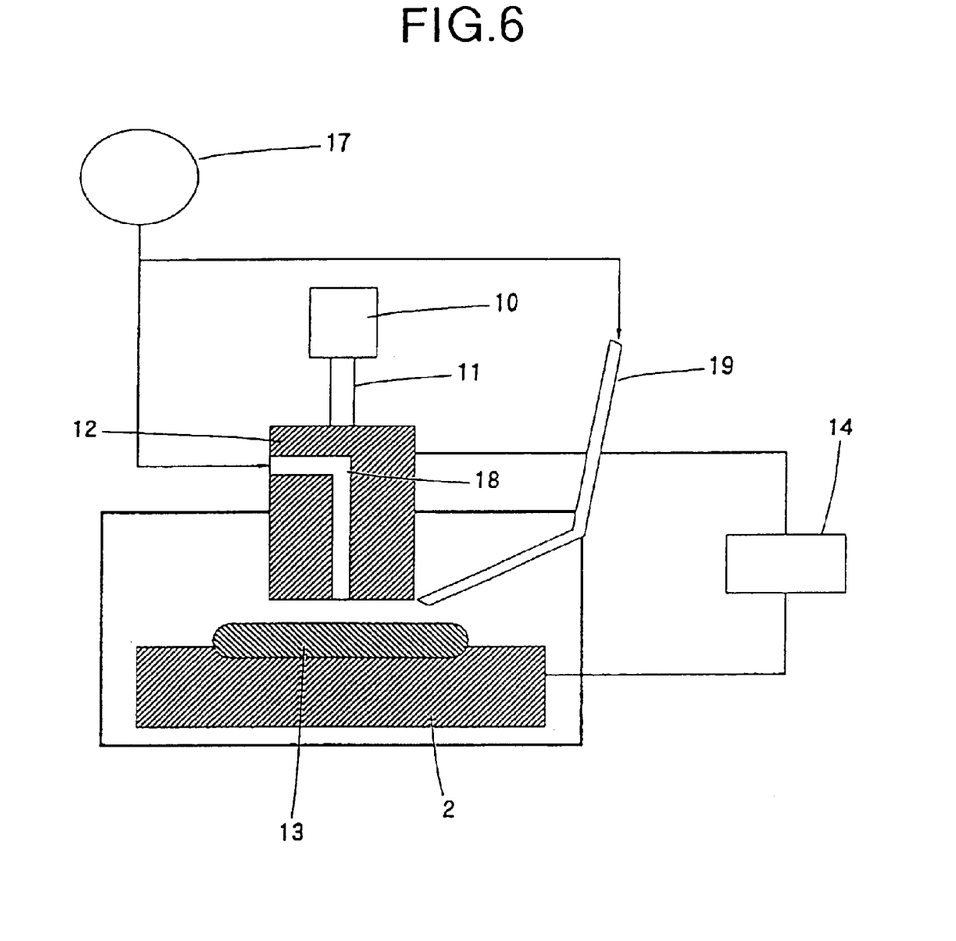
FIG. 6 is a structural drawing that shows a discharging surface treatment method and a device for such a method according to a third embodiment of the present invention.

FIG. 6 is a structural drawing that shows a discharging surface treatment method and a device for such a method according to a third embodiment of the present invention. This embodiment explains a discharging operation performed in the environment of gas. Reference number 2 represents a treatment target. Reference number 10 represents a shifting motor, and reference number 11 represents is a shifting thread. Reference number 12 represents a discharge processing electrode, and reference number 13 represents a hard coat film formed on the treatment target 2. Reference number 14 represents a control device, provided with a power supply, for controlling a current and a voltage. Reference number 17 represents a gas supply source, and reference number 18 represents a path and 19 is a supply pipe. The gas supply source 17 is connected to the path 18 installed inside the discharge processing electrode 12 through a pipe. While power is supplied by the power supply of the control device 14, inert gas, such as air or nitrogen gas, is supplied at a predetermined amount from the gas supply source 17. The supply pipe 19 is used for supplying gas from the outside of the electrode when a path is not formed inside the electrode, and in this case, gas is discharged toward the pole-to-pole gap. The objects of the gas supply are to cool off the pole-to-pole gap and to transport excessive electrode materials out of the system, and these object are the same as those of the processing fluid. Without the gas supply, it is difficult to form the hard coat film on the treatment target in a stable manner. With respect to the kinds of gases, air or nitrogen gas is suitable from the environmental point of view.

In the gaseous discharging operation of this type also, when a discharge is directly applied to the base member of the treatment target and when a discharge is further applied after the hard coat film has been formed, or in the course of formation of the thick, hard coat film, the electric conditions are altered so as to fit to the characteristics of the subject treatment material, that is, the electric conditions suitable for the subject treatment material are adopted. Thus, it becomes possible to carry out the process in a shorter time, and also to form a hard coat film with high adhesion.

INDUSTRIAL APPLICABILITY

As described above, the discharging surface treatment method and the device thereof according to the present invention is suitable for formation of a hard coat film on a treatment target.

What is claimed is:

1. A discharging surface treatment method for generating a discharge between an electrode and a treatment target so that a coating film is formed on the surface of the treatment target by the discharging energy, forming a powder mixture, comprising as one component: (a) a ferrous-family metal powder or a non-ferrous metal powder, wherein each of said metal powders can be formed of one or plural metals; and, as a second component, (b) one or a plurality of metal carbides, wherein the elemental metal of the carbide or carbides belongs to the IVB, VB or VIB families in the Periodic Table;

the non-ferrous metal powder having the same composition as the treatment target;

heating the powder mixture to a temperature at which said component (a) starts to melt to form an electrode that is approximately as hard as chalk and that serves as a discharge processing electrode, and electrical conditions at a time when a base member of the treatment target is directly subjected to a discharging surface treatment so as to form an initial coating film, and electrical conditions at a time when the initial coating film that has been formed on the base member is subjected to a further discharging surface treatment, are altered according to the characteristics of the treatment target material.

2. The discharging surface treatment method according to claim 1, wherein an inert gas is input between the discharge processing electrode and the treatment target.

3. The discharging surface treatment method according to claim 1, wherein the discharge processing electrode is allowed to scan the treatment target so that the coating film is formed on the surface of the treatment target.

4. A discharging surface treatment method for generating a discharge between an electrode and a treatment target so that a coating film is formed on the surface of the treatment target by the discharging energy, forming a powder mixture, comprising as one component: (a) a ferrous-family metal powder or a non-ferrous metal powder, wherein each of said metal powders can be formed of one or plural metals; and, as a second component, (b) one or a plurality of metal carbides, wherein the elemental metal of the carbide or carbides belongs to the IVB, VB or VIB families in the Periodic Table;

the non-ferrous metal powder having the same composition as the treatment target;

heating the powder mixture to a temperature at which said component (a) starts to melt to form an electrode that is approximately as hard as chalk and that serves as a discharge processing electrode, and electrical conditions, at a time when an initial coating film that has been formed is subjected to a discharging surface treatment, are altered at least once according to the characteristics of the treatment target material.

5. The discharging surface treatment method according to claim 4, wherein an inert gas is input between the discharge processing electrode and the treatment target.

6. The discharging surface treatment method according to claim 4, wherein the discharge processing electrode is allowed to scan the treatment target so that the coating film is formed on the surface of the treatment target.

7. A discharging surface treatment method for generating a discharge between an electrode and a treatment target so that a coating film is formed on the surface of the treatment target by the discharging energy, forming a powder mixture, comprising as one component: (a) a ferrous-family metal powder or a non-ferrous metal powder, wherein each of said metal powders can be formed of one or plural metals; and, as a second component, (b) one or a plurality of metal carbides, wherein the elemental metal of the carbide or carbides belongs to the IVB, VB or VIB families in the Periodic Table;

the non-ferrous metal powder having the same composition as the treatment target;

heating the powder mixture to a temperature at which said component (a) starts to melt to form an electrode that is approximately as hard as chalk and that serves as a discharge processing electrode, and electrical conditions at a time when a base member of the treatment target is directly subjected to a discharging surface treatment so as to form an initial coating film, and electrical conditions at a time when the initial coating film that has been formed is subjected to a further discharging surface treatment, are altered according to the characteristics of the treatment target material, and the electrical conditions, at the time when the initial coating film that has been formed on the base member is subjected to a discharging surface treatment, are altered at least once according to the characteristics of the treatment target material.

8. The discharging surface treatment method according to claim 7, wherein an inert gas is input between the discharge processing electrode and the treatment target.

9. The discharging surface treatment method according to claim 7, wherein the discharge processing electrode is allowed to scan the treatment target so that the coating film is formed on the surface of the treatment target.

10. A discharging surface treatment device for generating a discharge between a discharge processing electrode and a treatment target configured so that a coating film is formed on the surface of the treatment target by the discharging energy, comprising:

the discharge processing electrode formed of a powder mixture, comprising as one component: (a) a ferrous-family metal powder or a non-ferrous metal powder, wherein each of said metal powders can be formed of one or plural metals; and, as a second component, (b) one or a plurality of metal carbides, wherein the elemental metal of the carbide or carbides belongs to the IVB, VB or VIB families in the Periodic Table;

the non-ferrous metal powder having the same composition as the treatment target;

wherein the powder mixture is heated to a temperature at which said component (a) starts to melt to form an electrode that is approximately as hard as chalk and that serves as the discharge processing electrode; and said discharging surface treatment device is provided with a switching unit comprising means for altering electrical conditions at a time when a base member of the treatment target is directly subjected to a discharging surface treatment so as to form an initial coating film, and electrical conditions at a time when the initial coating film that has been formed on the base member is subjected to a further discharging surface treatment, according to the characteristics of the treatment target material.

11. The discharging surface treatment device according to claim 10, wherein an inert-gas supplying unit is installed so as to input an inert gas between the discharge processing electrode and the treatment target.

12. The discharging surface treatment device according to claim 10, wherein an X-axis driving device, a Y-axis driving device and a Z-axis driving device, which relatively shift the discharge processing electrode and the treatment target in the X-direction, Y-direction and Z-direction, are installed so that the X-axis driving device, the Y-axis driving device and the Z-axis driving device allow the discharge processing electrode to scan the treatment target to form the coating film on the surface of the treatment target.

13. A discharging surface treatment device for generating a discharge between a discharging processing electrode and a treatment target configured so that a coating film is formed on the surface of the treatment target by the discharging energy, comprising:

the discharge processing electrode formed of a powder mixture, comprising as one component: (a) a ferrous-family metal powder or a non-ferrous metal powder, wherein each of said metal powders can be formed of one or plural metals; and, as a second component, (b) one or a plurality of metal carbides, wherein the elemental metal of the carbide or carbides belongs to the IVB, VB or VIB families in the Periodic Table;

the non-ferrous metal powder having the same composition as the treatment target;

wherein the powder mixture is heated to a temperature at which said component (a) starts to melt to form an electrode that is approximately as hard as chalk and that serves as the discharge processing electrode; and said discharging surface treatment device is provided with a switching unit comprising means for altering electrical conditions, at a time when an initial coating film that has been formed is subjected to a discharging surface treatment, at least once according to the characteristics of the treatment target material.

14. The discharging surface treatment device according to claim 13, wherein an inert-gas supplying unit is installed so as to input an inert gas between the discharge processing electrode and the treatment target.

15. The discharging surface treatment device according to claim 13, wherein an X-axis driving device, a Y-axis driving device and a Z-axis driving device, which relatively shift the discharge processing electrode and the treatment target in the X-direction, Y-direction and Z-direction, are installed so that the X-axis driving device, the Y-axis driving device and the Z-axis driving device allow the sintered electrode to scan the treatment target to form the coating film on the surface of the treatment target.

16. A discharging surface treatment device for generating a discharge between a discharge processing electrode and a treatment target configured so that a coating film is formed on the surface of the treatment target by the discharging energy, comprising:

the discharge processing electrode formed of a powder mixture, comprising as one component: (a) a ferrous-family metal powder or a non-ferrous metal powder, wherein each of said metal powders can be formed of one or plural metals; and, as a second component, (b) one or a plurality of metal carbides, wherein the elemental metal of the carbide or carbides belongs to the IVB, VB or VIB families in the Periodic Table;

the non-ferrous metal powder having the same composition as the treatment target;

wherein the powder mixture is heated to a temperature at which said component (a) starts to melt to form an electrode that is approximately as hard as chalk and that serves as the discharge processing electrode; and said discharging surface treatment device is provided with a first switching unit and a second switching unit, wherein said first switching unit comprises means for altering the electrical conditions at a time when a base member of the treatment target is directly subjected to a discharging surface treatment so as to form an initial coating film, and for altering electrical conditions at a time when the initial coating film that has been formed is subjected to a further discharging surface treatment, according to the characteristics of the treatment target material, and wherein the second switching unit comprises a second means for altering electrical conditions, at a time when the initial coating film that has been formed on the base member is subjected to a further discharging surface treatment, at least once according to the characteristics of the treatment target material.

17. The discharging surface treatment device according to claim 16, wherein an inert-gas supplying unit is installed so as to input an inert gas between the discharge processing electrode and the treatment target.

18. The discharging surface treatment device according to claim 16, wherein an X-axis driving device, a Y-axis driving device and a Z-axis driving device, which relatively shift the discharge processing electrode and the treatment target in the X-direction, Y-direction and Z-direction, are installed so that the X-axis driving device, the Y-axis driving device and the Z-axis driving device allow the discharge processing electrode to scan the treatment target to form the coating film on the surface of the treatment target.

* * * * *

UNITED STATES PATENT AND TRADEMARK OFFICE
CERTIFICATE OF CORRECTION

PATENT NO. : 6,929,829 B2  
APPLICATION NO. : 09/872421  
DATED : August 16, 2005  
INVENTOR(S) : Naotake Mohri, Manabu Yoshida and Akihiro Goto It is certified that error appears in the above-identified patent and that said Letters Patent is hereby corrected as shown below:

On the Title Page: Item (73) Assignee: Please add --Naotake Mohri--

Signed and Sealed this

Twenty-fifth Day of September, 2007

JON W. DUDAS  
*Director of the United States Patent and Trademark Office*